US009182940B1

(12) United States Patent
Chen et al.

(10) Patent No.: US 9,182,940 B1
(45) Date of Patent: Nov. 10, 2015

(54) SYSTEMS AND METHODS FOR DETERMINING PLAYBACK LOCATIONS IN MEDIA FILES (71) Applicant: Amazon Technologies, Inc., Reno, NV (US)

(72) Inventors: Hong Chen, Bellevue, WA (US); Xi Long, Bellevue, WA (US); Rudy Darmawan, Kenmore, WA (US)

(73) Assignee: Amazon Technologies, Inc., Reno, NV (US)

( * ) Notice: Subject to any disclaimer, the term of this patent is extended or adjusted under 35 U.S.C. 154(b) by 142 days.

(21) Appl. No.: 14/101,686

(22) Filed: Dec. 10, 2013

(51) Int. Cl.
*G06F 3/00* (2006.01)
*G06F 3/16* (2006.01)
*G06F 17/30* (2006.01)

(52) U.S. Cl.
CPC .......... *G06F 3/165* (2013.01); *G06F 17/30746* (2013.01)

(58) Field of Classification Search
CPC ................................................ G06F 17/30746
USPC ....................................................... 715/716
See application file for complete search history.

(56) References Cited

U.S. PATENT DOCUMENTS

| 6,463,444 | B1 * | 10/2002 | Jain et al. ............................. 1/1 |
| 6,832,293 | B1 * | 12/2004 | Tagawa et al. ................ 711/115 |
| 8,175,441 | B2 * | 5/2012 | Tagawa et al. ................ 386/240 |
| 8,239,480 | B2 * | 8/2012 | Kokes et al. ................... 709/217 |
| 8,826,169 | B1 * | 9/2014 | Yacoub et al. ................ 715/776 |
| 8,875,009 | B1 * | 10/2014 | Lin et al. ....................... 715/206 |
| 2008/0141180 | A1 * | 6/2008 | Reed et al. .................... 715/854 |
| 2009/0063974 | A1 * | 3/2009 | Bull et al. ...................... 715/716 |
| 2011/0288861 | A1 * | 11/2011 | Kurzweil et al. ............. 704/235 |
| 2014/0082467 | A1 * | 3/2014 | Yoon et al. .................... 715/202 |
| 2015/0094834 | A1 * | 4/2015 | Vega et al. ....................... 700/94 |

* cited by examiner

*Primary Examiner* — William Titcomb
(74) *Attorney, Agent, or Firm* — Sutherland Asbill & Brennan, LLP (57) ABSTRACT

According to one or more embodiments, a method is provided. The method may include receiving an indication to pause playback of a media file at a current location in the media file. The method may also include receiving an indication to resume playback of the media file. Furthermore, the method may include determining an elapsed time between the indication to pause playback and the indication to resume playback. Furthermore, the method may include determining, based at least in part on the current location and the elapsed time, a second location in the media file that occurs before the current location. Further still, the method may include resuming playback of the media file at the second location.

20 Claims, 4 Drawing Sheets

SYSTEMS AND METHODS FOR DETERMINING PLAYBACK LOCATIONS IN MEDIA FILES

BACKGROUND

Media files are one of the most ubiquitous forms of digital media in the world today. In particular, audio books are becoming increasingly popular as a means for consuming books and other traditional textual data. However, when listening to an audio book, a user may pause playback of the audio book in the middle of a sentence. Upon resuming playback at a later time, the user may not be able to recall the context of the audio book content related to the middle of the sentence.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Described herein are systems and methods for determining playback locations in media files. Broadly, the systems and methods described herein may enable a service provider to determine playback locations in a media file. More particularly, the systems and methods described herein may determine suitable locations in a media file for resuming playback of the media file from a paused state. The determination may be made based at least in part on an amount of time elapsed between pausing and resuming playback of the media file. As used herein, a media file may include any type of media, such as audio data (e.g., audio books, music, lectures, etc.), video data (e.g., video clips, movies, television shows, etc.), textual data (e.g., documents, books, etc.) and/or the like.

For example, a user of a user device may begin playback of the media file, which in certain implementations, may be an audio book. At some point in time, the user may indicate, to the user device, to pause playback of the audio book at a current location. At another point in time, the user may indicate, to the user device, to resume playback of the audio book. Upon receiving the indication to resume playback of the audio book, the user device may calculate an elapsed time between the indication to pause playback and the indication to resume playback. Additionally, the user device may determine, based at least in part on the elapsed time, a second location in the audio book, which may occur before the current location at which the audio book was paused. Furthermore, the second location may correspond to the beginning of a sentence in the audio book. To this end, the user device may resume playback of the audio book at the second location (e.g., the beginning of the sentence).

Thus, the user device may avoid resuming playback in the middle of a sentence. Instead, playback of the audio book may be resumed at a beginning of a sentence that occurs before the current location at which the audio book was paused. As a result, a user's memory may be refreshed with appropriate context as he/she resumes playback of the audio book. Moreover, the length of time that has elapsed between pausing playback and resuming playback may determine the location in the audio book at which playback may be resumed. For instance, the current location at which the audio book was paused may be associated with a particular sentence, paragraph, and/or chapter. As such, if the elapsed time is within a few minutes, playback may be resumed at the beginning of the sentence. If the elapsed time is greater than a few minutes but within a few hours, playback may be resumed at the beginning of the paragraph. If the elapsed time is greater than a few hours, playback may be resumed at the beginning of the chapter. It should be appreciated that these proposed time thresholds are merely exemplary and that any other time thresholds are also possible.

In other embodiments, the audio book may be associated with a corresponding electronic book (e-book) (e.g., of the same title, author, etc.). Additionally, the user may also issue a voice command, to the user device, which instructs the user device to generate a first bookmark identifier at a location in the audio book of the user's choosing. Upon generation of the first bookmark identifier, the user device may also initiate the generation of a second bookmark identifier for the e-book associated with the audio book. The second bookmark identifier may correspond to the same location in the e-book as the location in the audio book identified by the first bookmark identifier. For instance, if the first bookmark identifier corresponds to the beginning of a particular sentence in the audio book, the second bookmark identifier may correspond to the beginning of the same sentence in the e-book.

According to one or more embodiments of the disclosure, in order to implement the broad concepts described above, a method is provided. The method may include receiving, by a user device comprising one or more processors, an indication to pause playback of an audio book at a current location in the audio book. The method may also include pausing playback of the audio book at the current location and receiving an indication to resume playback of the audio book. Furthermore, the method may include determining an elapsed time between the indication to pause playback and the indication to resume playback. Additionally, the method may include accessing an electronic book (e-book) associated with the audio book, the e-book further associated with text structure information. Furthermore, the method may include determining, based at least in part on the text structure information, the current location, and the elapsed time, a second location in the audio book that occurs before the current location. The second location may be associated with a beginning of a sentence in the audio book. Further still, the method may include resuming playback of the audio book at the second location.

According to one or more other embodiments of the disclosure, a device is provided. The device may include at least one memory for storing data and computer-executable instructions. Additionally, the device may also include at least one processor to access the at least one memory and to execute the computer-executable instructions. Furthermore, the at least one processor may be configured to execute the instructions to receive an indication to pause playback of a media file at a current location in the media file. The at least one processor may also be configured to execute the instructions to pause playback of the media file at the current location and receive an indication to resume playback of the media file. Additionally, the at least one processor may be configured to execute the instructions to determine an elapsed time between the indication to pause playback and the indication to resume playback. The at least one processor may also be configured to execute the instructions to determine, based at least in part on the elapsed time, a second location in the media file, wherein during playback of the media file, the second location is reached before the current location. Moreover, the at least one processor may be configured to execute the instructions to resume playback of the media file at the second location.

According to one or more embodiments of the disclosure, a non-transitory computer-readable medium is provided. The non-transitory computer-readable medium may have embodied thereon instructions executable by one or more processors. The instructions may cause the one or more processors to receive an indication to pause playback of an audio book at a current location in the audio book, pause playback of the audio book at the current location, and receive an indication to resume playback of the audio book. Furthermore, the instructions may cause the one or more processors to determine an elapsed time between the indication to pause playback and the indication to resume playback. Additionally, the instructions may cause the one or more processors to determine, based at least in part on the elapsed time, a second location in the audio book that occurs before the current location and to resume playback of the audio book at the second location.

Figure 1:
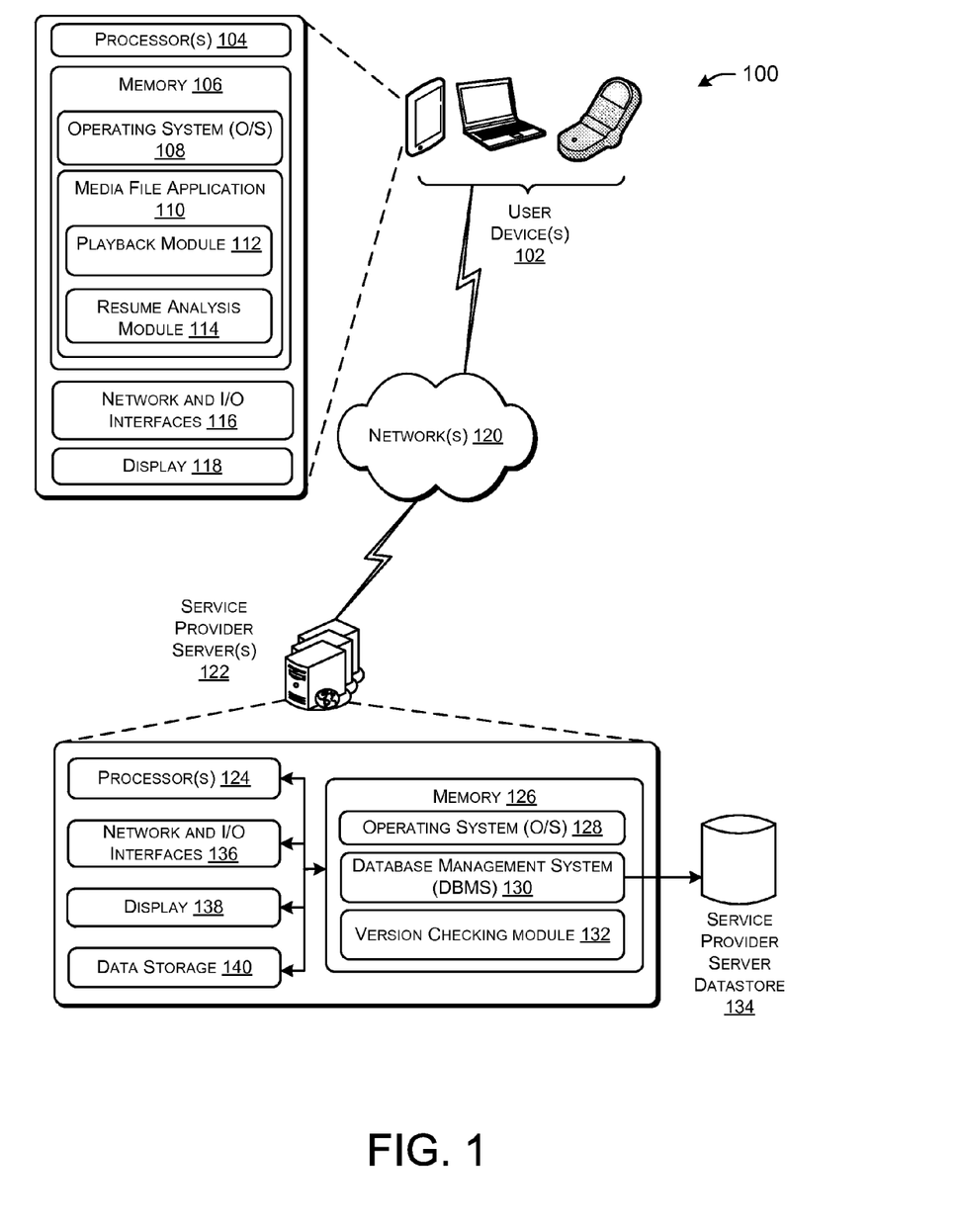
FIG. 1 illustrates a system for determining playback locations in media files in accordance with one or more embodiments of the disclosure.

With reference now to FIG. 1, a system 100 for determining playback locations in media files is shown according to one or more embodiments of the disclosure. The system 100 may include one or more user device(s) 102. In general, the user device 102 may refer to any type of electronic device, and, more particularly, may refer to one or more of the following: a wireless communication device, a portable electronic device, a telephone (e.g., cellular phone, smart phone), a computer (e.g., laptop computer, tablet computer), a wearable computer device, a portable media player, a personal digital assistant (PDA), or any other electronic device having a networked capability. The user device(s) 102 may include one or more computer processors 104, a memory 106 storing an operating system 108 and a media file application 110, network and input/output (I/O) interfaces 116, and a display 118. In certain embodiments, the user device(s) 102 may include one or more sensors capable of gathering information associated with a present environment of the user device(s) 102, or similar hardware devices, such as a camera, a microphone, an antenna, or Global Positioning Satellite (GPS) device.

The computer processors 104 may comprise one or more cores and may be configured to access and execute (at least in part) computer-readable instructions stored in the memory 106. The one or more computer processors 104 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 102 may also include a chipset (not shown) for controlling communications between the one or more processors 104 and one or more of the other components of the user device 102. The one or more processors 104 may also include one or more application-specific integrated circuits (ASICs) or application-specific standard products (ASSPs) for handling specific data processing functions or tasks.

The memory 106 may comprise one or more computer-readable storage media (CRSM). In some embodiments, the memory 106 may include non-transitory media such as random access memory (RAM), flash RAM, magnetic media, optical media, solid state media, and so forth. The memory 106 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 106 may store an operating system 108 that includes a plurality of computer-executable instructions that may be implemented by the computer processor to perform a variety of tasks to operate the interface(s) and any other hardware installed on the user device 102. The operating system 108 may include any operating system now known or which may be developed in the future including, but not limited to, any server operating system, any mainframe operating system, or any other proprietary or freely available operating system. The memory 106 may also store content that may be displayed by the user device 102 or transferred to other devices (e.g., headphones) to be displayed or played by the other devices. The memory 106 may also store content received from the other devices. The content from the other devices may be displayed, played, or used by the user device 102 to perform any necessary tasks or operations that may be implemented by the computer processor or other components in the user device 102.

Furthermore, the memory 106 may store a media file application 110. The media file application 110 may include a playback module 112 to facilitate playback of audio content (e.g., audio books, lectures, recorded audio, music, etc.) on the user device 102. The media file application 110 may also include a resume analysis module 114 to determine a location in the media file at which playback should be resumed after a pause in the media file. The operations of the media file application 110 and its included modules are described in more detail below.

The network and I/O interfaces 116 may also comprise one or more communication interfaces or network interface devices to provide for the transfer of data between the user device 102 and another device (e.g., network server) via a network (not shown). The communication interfaces may include, but are not limited to: personal area networks (PANs), wired local area networks (LANs), wireless local area networks (WLANs), wireless wide area networks (WWANs), and so forth. The user device 102 may be coupled to the network via a wired connection. However, the wireless system interfaces may include the hardware and software to broadcast and receive messages either using the Wi-Fi Direct Standard (see Wi-Fi Direct specification published in October 2010) and/or the IEEE 802.11 wireless standard (see IEEE 802.11-2007, published Mar. 8, 2007; IEEE 802.11n-2009, published October 2009), or a combination thereof. The wireless system (not shown) may include a transmitter and a receiver or a transceiver (not shown) capable of operating in a broad range of operating frequencies governed by the IEEE 802.11 wireless standards. The communication interfaces may utilize acoustic, radio frequency, optical, or other signals to exchange data between the user device 102 and another device such as an access point, a host computer, a server, a router, a reader device, and the like. The network may include, but is not limited to: the Internet, a private network, a virtual private network, a wireless wide area network, a local area network, a metropolitan area network, a telephone network, and so forth.

The display 118 may include, but is not limited to, a liquid crystal display, a light-emitted diode display, an E-Ink™ display as made by E Ink Corp. of Cambridge, Mass., or any other similar type of output device. The display 118 may be used to show content to a user in the form of text, images, or video. In certain instances, the display 118 may also operate as a touch screen display that may enable the user to initiate commands or operations by touching the screen using certain finger or hand gestures.

According to one or more embodiments, the user device 102 may be in communication, via one or more networks 120, with one or more service provider server(s) 122. As used herein, unless otherwise specified, the term "server" may refer to any computing device having a networked connectivity and configured to provide one or more dedicated services to clients, such as a user device 102. The services may include storage of data or any kind of data processing, such as information related to media files and playback of media files associated with the user device 102.

As such, the service provider server(s) 122 may include one or more processor(s) 124 and a memory 126. The processor(s) 124 may include any type of processors described above with respect to the processor(s) 104 of the user device 102. Similarly, the memory 126 may include any type of memory described above with respect to the memory 106 included in the user device 102.

The memory 126 may also store an operating system (O/S) 128, a database management system (DBMS) 130, and a resume analysis module 132. The operating system 128 may provide an interface between other application software executing on the service provider server 122 and the hardware resources of the service provider server 122. More specifically, the operating system 128 may include a set of computer-executable instructions for managing hardware resources of the service provider server 122 and for providing common services to other application programs (e.g., managing memory allocation among various application programs). The operating system 128 may include any operating system now known or which may be developed in the future including, but not limited to, any server operating system, any mainframe operating system, or any other proprietary or freely available operating system.

It should be appreciated that any data and/or computer-executable instructions stored in the memory 126 may be additionally, or alternatively, stored in the data storage 140 and/or in one or more other service provider server datastores 134. The DBMS 130 depicted as being loaded into the memory 126 may support functionality for accessing, retrieving, storing, and/or manipulating data stored in external datastore(s) (e.g., the service provider server datastore(s) 134), data stored in the memory 126, and/or data stored in the data storage 140. For example, the DBMS 130 may be configured to retrieve file data such as media file data and/or user account data (e.g., audio books associated with the user account) from the service provider server datastores 134. The DBMS 130 may use any of a variety of database models (e.g., relational model, object model, etc.) and may support any of a variety of query languages.

In addition, the service provider server(s) 122 may also include network and I/O interfaces 136, a display 138, and data storage 140. Data storage 140 may include any type of storage media such as removable storage and/or non-removable storage including, but not limited to, magnetic storage, optical disk storage, and/or tape storage. Data storage 140 may provide non-transient storage of computer-executable instructions and other data. The data storage 140 may include storage that is internal and/or external to the service provider server 122. The memory 126 and/or the data storage 140, removable and/or non-removable, are examples of computer-readable storage media (CRSM) as that term is used herein.

In general terms, the media file application 110 may be configured to manage playback of media files, such as audio books. It will be appreciated that while various references below may be made to media files as audio books, such references are for illustrative purposes only. Other types of media files are also contemplated including, but not limited to, recorded audio content, music, and/or the like.

According to one or more embodiments, and as discussed above, the media file application 110 may include a playback module 112 and a resume analysis module 114. The playback module 112 may be configured to receive instructions (e.g., from the user) to play, pause, and/or resume playback of a media file. The resume analysis module 114 may be configured to determine one or more locations in the media file at which to resume playback. For example, if the playback module 112 receives instructions to resume playback of a media file, the resume analysis module 114 may determine, based at least in part on an amount of elapsed time between the instructions to resume playback and a previous instruction to pause playback, a location in the audio book at which to resume playback. In certain embodiments, and as described in more detail with reference to FIG. 2, the functions of the resume analysis module 114 in the user device 102 may instead be performed by the resume analysis module 132 in the service provider server 122.

Figure 2:
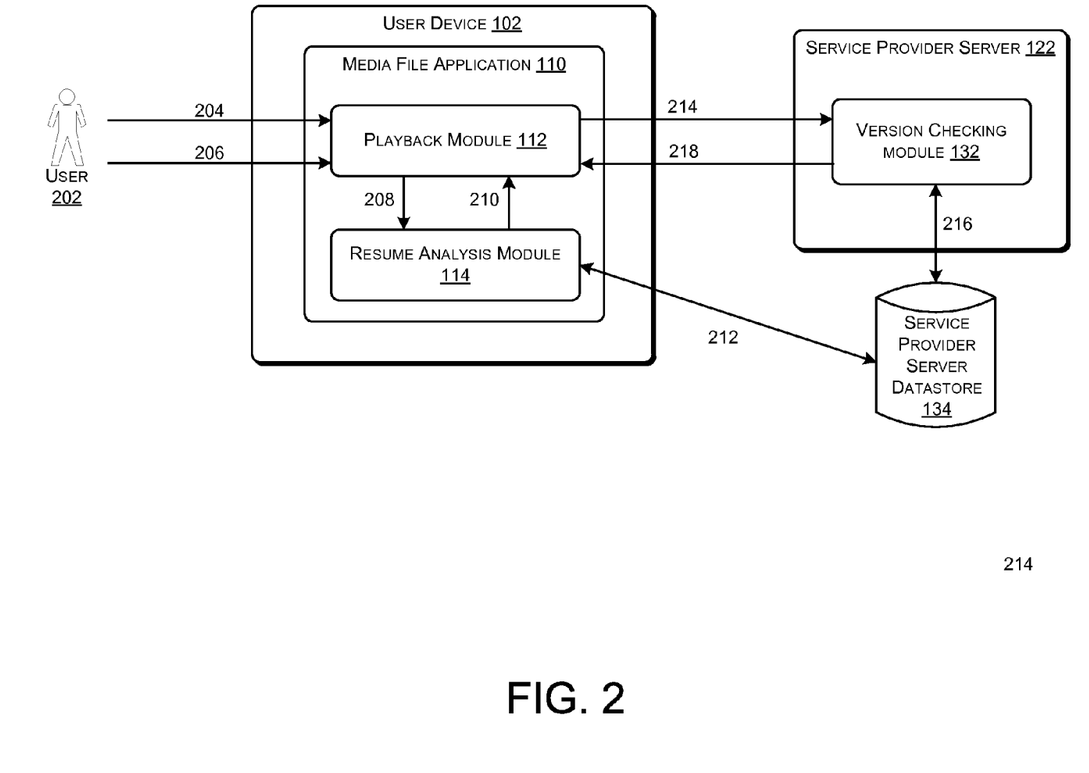
FIG. 2 illustrates a data flow diagram for determining playback locations in media files in accordance with one or more embodiments of the disclosure.

Referring now to FIG. 2, a block diagram is provided that illustrates a data flow 200 between the various components of the system 100 of FIG. 1. According to one or more example embodiments, a user 202 of the user device 102 may indicate a selection 204 to pause playback of an media file, such as an audio book. It will be appreciated that while the discussion of FIG. 2 may refer to the media file as an audio book, other types of media files are also contemplated. Upon receipt of the selection 204, the playback module 112 in the media file application 110 may pause playback of the audio book. After the audio book has been paused, the user 202 may transmit another selection 206 to resume playback of the audio book at another point in time. Upon receipt of the selection 206 to resume playback, the playback module 112 may be configured to calculate an elapsed time between the selection 204 to pause playback and the selection 206 to resume playback. The playback module 112 may then transmit the elapsed time 208 to the resume analysis module 114.

As previously discussed, the resume analysis module 114 may be configured to determine, based at least in part on the elapsed time, a suitable location in the audio book at which to resume playback. In order to facilitate such a determination, the resume analysis module 114 may access text structure information and/or other types of textual information associated with the audio book. For example, the text structure information may include data that identifies and/or matches one or more sections of a textual representation (e.g., an electronic book (e-book)) of an audio book with corresponding locations in the audio book.

In certain embodiments, the text structure information may include identifiers that identify one or more sections of the audio book, such as words, sentences, paragraphs, chapters, and/or the like. As such, these identifiers may be interconnected with each other. For instance, a word identifier may be associated with a sentence identifier, both the word identifier and the sentence identifier may be associated with a paragraph identifier, and all three of the word identifier, the sentence identifier, and the paragraph identifier may be associated with a chapter identifier. Furthermore, different identifiers may correspond to different locations in the audio book. For instance, a first sentence identifier may correspond to a first location in the audio book while a second sentence identifier may correspond to a second location in the audio book.

In certain embodiments, the text structure information may be derived and/or otherwise determined from a textual representation of the audio book (e.g., the e-book). For example, the resume analysis module 114 and/or the service provider server 122 may be configured to compare an audio with a textual representation of the audio book, such as an e-book. To this end, the resume analysis module 114 and/or the service provider server 122 may identify one or more sections in the audio book that correspond to certain sections in the textual representation (e.g., a particular word, sentence, paragraph, chapter, scene, topic, etc.). Such identifiers may be stored as text structure information associated with the audio book. In certain implementations, a media file may include data related to both the text structure information and the audio book. In other implementations, the text structure information may be stored in the service provider server datastore 134. Alternatively, the text structure information may also be stored locally in the user device 102, in the data storage 140 of the service provider server 122, and/or in any other storage location in communication with the network 120.

Referring back to the data flow 200, upon receipt of the elapsed time 208, the resume analysis module 114 may determine, based at least in part on the calculated elapsed time, a resume location 210 to resume playback of the audio book at a location that corresponds to the beginning of one of the identified sections in the audio book. Upon determination of the location to resume playback, the resume analysis module 114 may transmit the location 210 back to the playback module 112. The playback module 112 may then resume playback of the audio book at the determined location. In some embodiments, the greater the elapsed time, the farther back in the audio book that the resume analysis module 114 may determine to resume playback. For example, if the elapsed time is within 5 seconds, the determined resume location may simply be the current location at which the audio book was paused. If the elapsed time is between 5 seconds and 5 minutes, the determined resume location may correspond to the beginning of a sentence associated with the current location. If the elapsed time is between 5 minutes and 1 hour, the determined resume location may correspond to the beginning of a paragraph associated with the current location. If the elapsed time is greater than 1 hour, the determined resume location may correspond to the beginning of a chapter associated with the current location. It should be understood that example elapsed time limits are merely for illustrative purposes, and that any other time limits are also contemplated.

In other embodiments, the determined resume location may be determined based at least in part on past resume locations input by a user of the user device 102. For instance, the media file application 110 and/or the service provider server 122 may store data related to user interaction with the media file application 110. More specifically, the playback module 112 may be configured to enable the user to resume playback at any location of the user's choosing, which may override the resume location determined by the resume analysis module 114. As such, the resume analysis module 114 may be configured to store user interaction data 212 related to instances where the user may choose to resume playback at an overriding location. Such user interaction data may be stored in a user profile, such as in the service provider server datastore 134. To this end, the user interaction data may also be used to determine resume locations for other media files as well as for media files on other devices. Thus, while the resume playback module 114 may be configured to determine resume locations based on predetermined time thresholds (e.g., 5 seconds, 5 minutes, 1 hour, etc.), such thresholds and resume locations may also be dynamically adjusted according to user interaction data. For example, if a user frequently overrides the determined location of the resume analysis module 114 to approximately two sentences earlier in an audio book, the resume analysis module 114 may adjust future resume locations to two sentences earlier than it would normally determine.

According to other embodiments, a stored textual representation associated with the audio book may not exist. Thus, the resume analysis module 114 may be configured to generate a textual representation of the audio book. For instance, the resume analysis module 114 may be configured to employ one or more speech-to-text algorithms to generate the textual representation of the audio book. Furthermore, the resume analysis module 114 may be configured to annotate the textual representation to determine one or more sections in the textual representation, as well as associate these sections with corresponding locations in the audio book. It will be appreciated that the service provider server 122 may also be configured to generate a textual representation of the audio book in a similar manner.

According to one or more embodiments, the media file application 110 (e.g., the playback module 112) may be configured to periodically determine whether an updated version of the audio book exists. To this end, the playback module 112 maybe configured to transmit a request 214, to the version checking module 132 of the service provider server 122, to check if there is a newer version of the audio book. In response, the version checking module 132 may be configured to query 216 the service provider server datastore 134 for a newer version. The version checking module 132 may then transmit 218 the result to the playback module 112. In certain instances, the result may simply indicate that no new version exists. In other instances, the version checking module 132 may transmit confirmation that a new version does exist. To this end, the version checking module 132 may also transmit the new version to the playback module 112. The playback module 112 may then update the audio book and the associated text structure information to correspond to the newer version.

Figure 3:
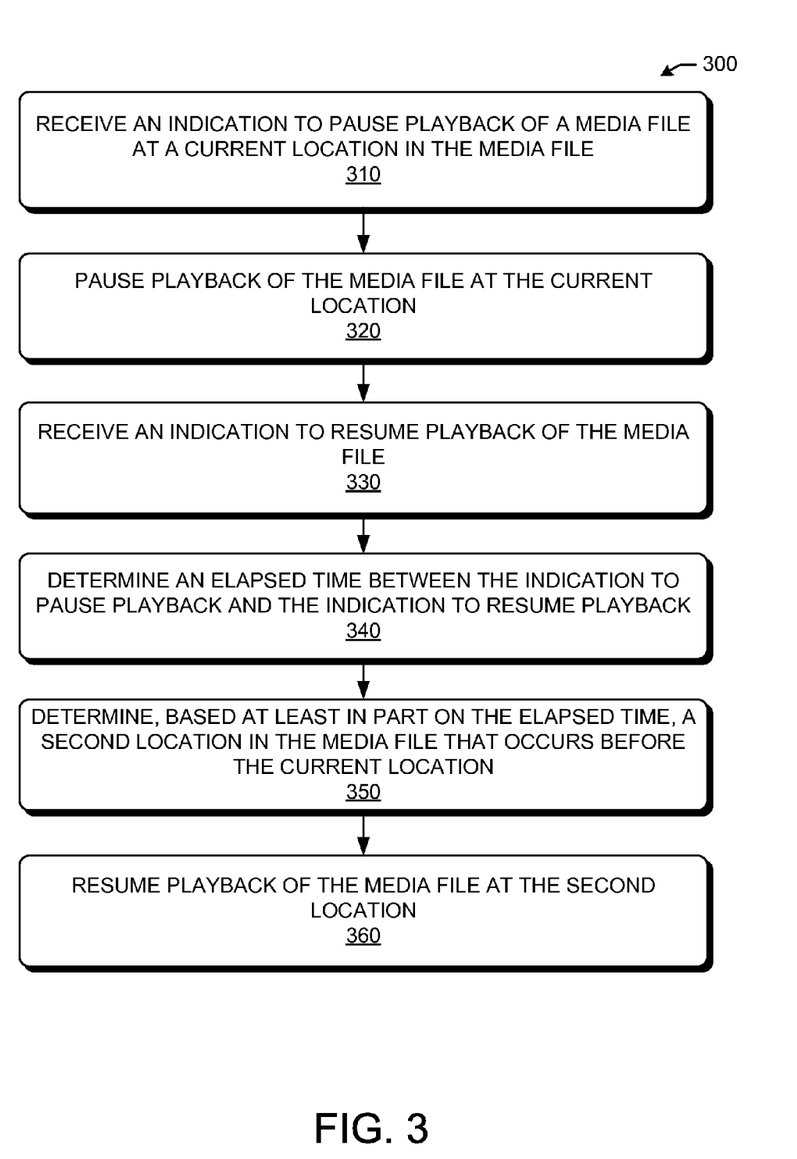
FIG. 3 illustrates a flow diagram for determining playback locations in media files in accordance with one or more embodiments of the disclosure.

Referring now to FIG. 3, a flow diagram of a method 300 for determining playback locations in media files is illustrated according to one or more example embodiments. The method 300 may begin in block 310, where a media file application 110 in a user device 102 may receive an indication to pause playback of a media file at a current location in the media file. In certain embodiments, the indication may be received by a playback module 112 included in the media file application 110. Furthermore, in certain embodiments, the media file may be an audio book, although various other types of media files are also contemplated.

In block 320, in response to the received indication, the media file application 110 (e.g., via the playback module 112)

may pause playback of the media file at the current location. In block 330, the media file application 110 (e.g., via the playback module 112) may receive an indication to resume playback of the media file. The indication to resume playback may be received at a point in time after receiving the indication to pause playback.

According to one or more embodiments, in block 340, the media file application 110 (e.g., via the playback module 112) may determine an elapsed time between the indication to pause playback and the indication to resume playback of the media file. As such, in block 350, the media file application 110 may determine (e.g., via the resume analysis module 114), based at least in part on the elapsed time, a second location in the media file that occurs before the current location. In certain implementations, the second location may correspond to the beginning of a particular section associated with the media file. For example, if the media file were an audio book, the second location may correspond to the beginning of a sentence in the audio book, which may correspond to a location prior to the current location at which the audio book was paused. In block 360, the media file application 110 (e.g., via the playback module 112) may resume playback of the media file at the second location.

Figure 4:
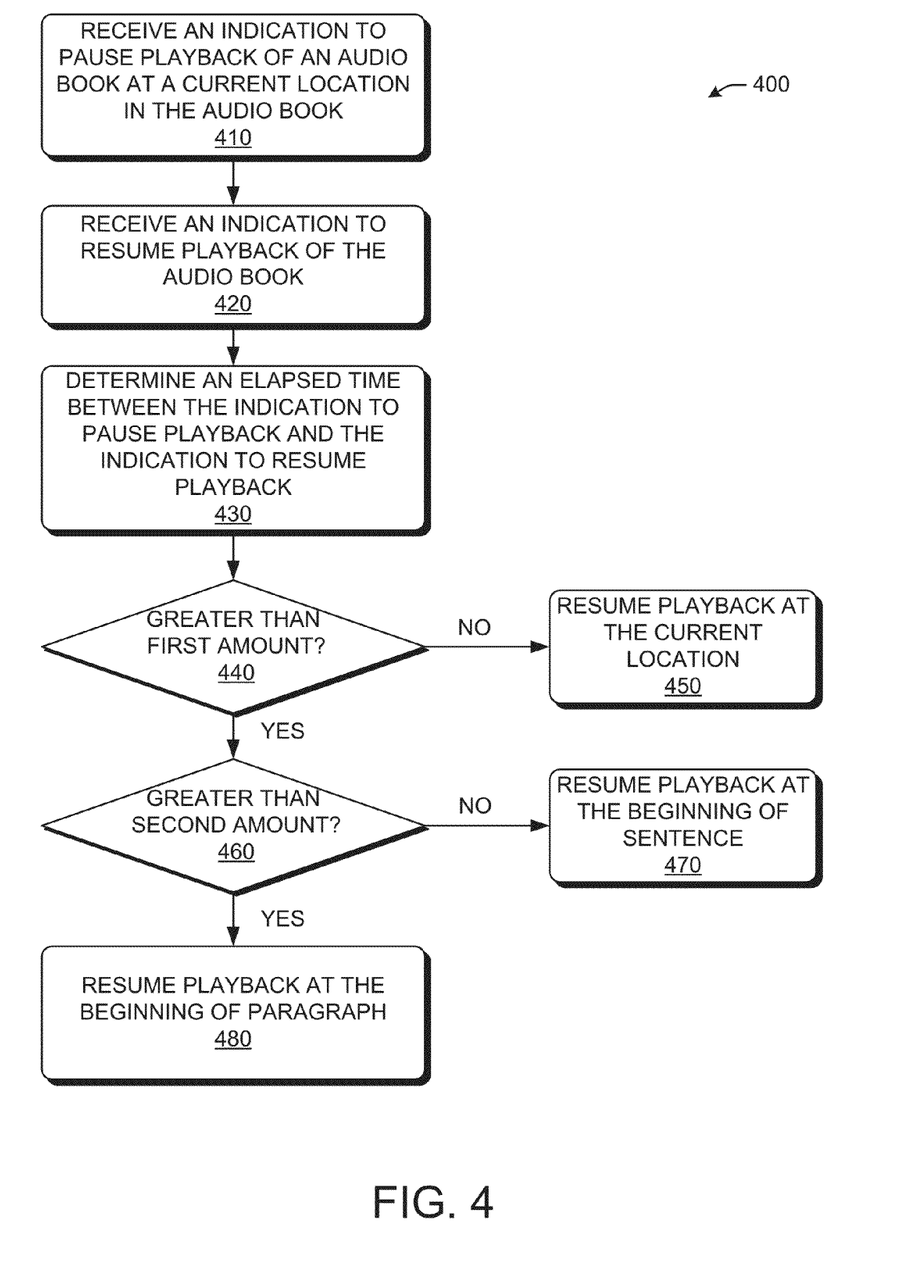
FIG. 4 illustrates another flow diagram for determining playback locations in audio books in accordance with one or more embodiments of the disclosure.

Referring now to FIG. 4, a flow diagram of a method 400 for determining playback locations in an audio book is illustrated according to one or more example embodiments. The method 400 may begin in block 410, where a media file application 110 may receive an indication to pause playback of an audio book at a current location in the audio book. In block 420, the media file application 110 may subsequently receive an indication to resume playback of the audio book. In block 430, the media file application 110 may be configured to determine an elapsed time between the indication to pause playback and the indication to resume playback.

To this end, in decision block 440, the media file application 110 may determine whether the elapsed time is greater than a first threshold. If the elapsed time is not greater than the first threshold, the media file application 110 may resume playback of the audio book at the current location at which it was paused in block 450. If the elapsed time is greater than the first threshold, the method 400 may proceed to decision block 460. In block 460, the media file application 110 may be configured to determine if the elapsed time is greater than a second threshold. In certain implementations, the second threshold may be greater than the first threshold. If the elapsed time is not greater than the second threshold, the media file application 110 may resume playback of the audio book at the beginning of a sentence associated with the current location in block 470.

For example, the media file application 110 may access an e-book associated with the audio book. As such, the media file application 110 may determine, based at least in part on the text structure information associated with the e-book, that the current location in the audio book corresponds to a particular sentence (e.g., and/or a particular word, paragraph, chapter, etc.) in the e-book. The media file application 110 may then determine a location in the audio book that corresponds to the beginning of the particular sentence in the e-book. Upon such a determination, the media file application 110 may resume playback of the audio book at the determined location.

If on the other hand, the elapsed time is greater than the second threshold, the media file application 110 may be configured to resume playback of the audio book at the beginning of a paragraph associated with the current location in the audio book in block 480. For example, the media file application 110 may access an e-book associated with the audio book. As such, the media file application 110 may determine, based at least in part on the text structure information associated with the e-book, that the current location in the audio book corresponds to a particular paragraph (e.g., and/or a particular word, sentence, chapter, etc.) in the e-book. The media file application 110 may then determine a location in the audio book that corresponds to the beginning of the particular paragraph in the e-book. Upon such a determination, the media file application 110 may resume playback of the audio book at the determined location.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method, comprising:
   receiving, by a user device comprising one or more processors, an indication to pause playback of an audio book at a current location in the audio book;
   pausing playback of the audio book at the current location;
   receiving an indication to resume playback of the audio book;
   determining an elapsed time between the indication to pause playback and the indication to resume playback;
   accessing text structure information associated with the audio book;
   determining, based at least in part on the text structure information, the current location, and the elapsed time, a second location in the audio book that occurs before the current location, wherein a distance between the second location and the current location increases as the elapsed time increases, and wherein the second location is associated with a beginning of a sentence in the audio book; and
   resuming playback of the audio book at the second location.

2. The method of claim 1, wherein the second location is further associated with a beginning of a paragraph in the audio book when the elapsed time is greater than a first threshold.

3. The method of claim 2, wherein the second location is further associated with a beginning of a chapter in the audio book when the elapsed time is greater than a second threshold, wherein the second threshold is greater than the first threshold.

4. The method of claim 1, wherein:
   the current location is associated with a current sentence at which playback of the audio book was paused, and
   determining the second location comprises determining a number of sentences before the current sentence.

5. A system, comprising:
   at least one processor;
   at least one memory storing computer-executable instructions, that when executed by the at least one processor, cause the at least one processor to:
      receive an indication to pause playback of a media file at a first location in the media file;
      pause playback of the media file at the first location;
      receive an indication to resume playback of the media file;
      determine an elapsed time between the indication to pause playback and the indication to resume playback;
      determine, based at least in part on the elapsed time, a second location in the media file, wherein the second location occurs prior to the first location; and
      resume playback of the media file at the second location.

6. The system of claim 5, wherein the computer-executable instructions further cause the at least one processor to:
   determine the second location based at least in part on a previous pause location or a previous resume location.

7. The system of claim 5, wherein the computer-executable instructions further cause the at least one processor to:
   access text structure information associated with the media file, wherein the media file is an audio book and the text structure information indicates one or more sections of the audio book.

8. The system of claim 7, wherein the computer-executable instructions to determine the second location further comprise instructions to:
   determine, based at least in part on the elapsed time exceeding a threshold, that the second location is to be associated with a beginning of a section, of the one or more sections, in the audio book.

9. The system of claim 8, wherein the section comprises at least one of a sentence, a paragraph, a chapter, a scene, or a topic.

10. The system of claim 7, wherein the computer-executable instructions to determine the second location further comprise instructions to:
    determine, from the one or more sections, a first section associated with the first location at which playback of the audio book was paused; and
    determine, based at least in part on the elapsed time, to resume playback of the audio book at a number of sections prior to the current section.

11. The system of claim 5, wherein the computer-executable instructions further cause the at least one processor to:
    generate, in response to a voice instruction from a user, a bookmark identifier associated with a third location in the media file.

12. The system of claim 11, wherein the computer-executable instructions further cause the at least one processor to:
    generate a corresponding bookmark identifier for an electronic book associated with the media file, the corresponding bookmark identifier associated with a location in the electronic book that corresponds to the third location in the media file.

13. A non-transitory computer-readable medium comprising instructions that when executed by at least one processor, cause the at least one processor to:
    receive an indication to pause playback of a media file at a first location in the media file;
    pause playback of the media file at the first location;
    receive an indication to resume playback of the media file;
    determine an elapsed time between the indication to pause playback and the indication to resume playback;
    determine, based at least in part on the elapsed time, a second location in the media file that occurs before the first location; and
    resume playback of the media file at the second location.

14. The computer-readable medium of claim 13, wherein the computer-executable instructions further cause the at least one processor to:
    determine the second location based at least in part on one or more past resume locations input by the user.

15. The computer-readable medium of claim 13, wherein computer-executable instructions further cause the at least one processor to:
    access text structure information associated with the media file, wherein the media file is an audio book and the text structure information indicates one or more sections of the audio book.

16. The computer-readable medium of claim 15, wherein the computer-executable instructions to determine the second location further comprise instructions to:
    determine, based at least in part on the elapsed time exceeding a threshold, that the second location is to be associated with a beginning of a respective section, of the one or more sections, in the audio book.

17. The system of claim 15, wherein the respective section comprises at least one of a sentence, a paragraph, a chapter, a scene, or a topic.

18. The computer-readable medium of claim 15, wherein the computer-executable instructions to determine the second location further comprise instructions to:
- determine, from the one or more sections, a first section associated with the first location at which playback of the audio book was paused; and
- determine, based at least in part on the elapsed time, to resume playback of the audio book at a predetermined number of sections prior to the first section.

19. The computer-readable medium of claim 14, wherein the computer-executable instructions further cause the at least one processor to:
- generate, in response to a voice instruction from a user, a bookmark identifier associated with a third location in the media file.

20. The computer-readable medium of claim 19, wherein the computer-executable instructions further cause the at least one processor to:
- generate a corresponding bookmark identifier for an electronic book associated with the media file, the corresponding bookmark identifier associated with a location in the electronic book that corresponds to the third location in the media file.

* * * * *